US006094685A

United States Patent [19]
Greenberg et al.

[11] Patent Number: 6,094,685
[45] Date of Patent: Jul. 25, 2000

[54] USE OF CONTROL BLOCKS TO MAP MULTIPLE UNIDIRECTIONAL CONNECTIONS

[75] Inventors: Marc A. Greenberg, Holliston; Sushil Shelley, Shrewsbury, both of Mass.

[73] Assignee: Ascend Communications, Inc., Westford, Mass.

[21] Appl. No.: 09/059,934

[22] Filed: Apr. 14, 1998

[51] Int. Cl.[7] ...................................................... G06F 15/16
[52] U.S. Cl. ........................ 709/227; 709/242; 370/395; 370/397; 370/252
[58] Field of Search .................................. 709/227, 242; 370/395, 396, 397, 252

[56] References Cited

U.S. PATENT DOCUMENTS

| 5,521,917 | 5/1996 | Watanabe et al. ........................ 370/1 |
| 5,546,387 | 8/1996 | Larsson et al. ........................... 370/60 |
| 5,666,361 | 9/1997 | Aznar et al. ............................. 370/392 |
| 5,777,994 | 7/1998 | Takihiro et al. ......................... 370/395 |
| 5,912,881 | 6/1999 | Glaise et al. ............................ 370/252 |
| 5,914,956 | 6/1999 | Williams ................................. 370/395 |

*Primary Examiner*—Ahmad F. Matar
*Assistant Examiner*—Saleh Najjar
*Attorney, Agent, or Firm*—Weingarten, Schurgin, Gagnebin & Hayes LLP

[57] ABSTRACT

A method and apparatus for allocating and deallocating control blocks for virtual connections in a network telecommunications device allows optimal usage of memory. Lists are maintained within the telecommunications device which identify control blocks as being fully utilized or partially utilized for either an incoming or outgoing connection. New connection requests for a user are handled by utilizing a partially used control block, if available, to avoid the allocation of unused memory resources in partially utilized control blocks.

6 Claims, 11 Drawing Sheets

C: Combined List
R: Root List
L: Leaf List

Fig 10a

U1 LEAF ——————— ROOT U6

Fig 10b

U1 LEAF ——————— ROOT U6
U1 ROOT——————— LEAF U4

Fig 10c

U1 LEAF ——————— ROOT U6
U1 ROOT——————— LEAF U4
U1 LEAF ——————— ROOT U3

Fig 10d

U1 LEAF ——————— ROOT U6
U1 LEAF ——————— ROOT U3

Fig 10e

U1 LEAF ——————— ROOT U3

USE OF CONTROL BLOCKS TO MAP MULTIPLE UNIDIRECTIONAL CONNECTIONS

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention is generally related to telecommunications systems, and more particularly to a method and apparatus for efficiently utilizing control blocks in a connection based network.

Telecommunications networks facilitate transmission of data from any number of source users to any number of destination users. Such networks may comprise a plurality of network switches for directing data traffic within the network. In connection based networks, such as Asynchronous Transfer Mode (ATM) networks, virtual connections are established between designated user pairs within the network and traffic is forwarded over a virtual connection from a source node to a destination node via one or more network switches.

In conventional ATM based networks, a data structure, known as a control block is contained within the memory of a network switch and is employed to map user traffic to a virtual connection. Each control block allocated within memory includes a first control block portion for mapping traffic emanating from a switch and a second control block portion for mapping traffic destined for a switch although only one of those portions is utilized in a given control block.

A user which is to be the recipient of message traffic is identified as a destination or root user node. A user which is the source of message traffic is identified as a source user node or leaf node. Thus message traffic is typically forwarded from a leaf node to a root node. Each root or leaf node has a complementary leaf or root node, respectively, serving the remote user.

A control block is assigned within a network switch node at the edge of the network to map the respective user to a virtual connection for either incoming or outgoing traffic at call setup. Once either the first or second portion of a control block is utilized to map traffic either from the user or to the user, respectively, the other control block portion remains unused. Such is wasteful of memory which comprises a costly and limited resource.

More specifically, in response to a request from a root node, a network switch comprising the respective leaf node configures a control block within the switch to permit the leaf node to communicate with the root node. The network switch at the edge of the network which couples the root node to the network also needs to configure a control block within the coupled switch to permit message traffic to be forwarded from the leaf node to the corresponding root node. As described above, once either the first or second portion of the control block is assigned within the switch coupling either the leaf or root node to the network, the remaining control block portion remains unused.

It would therefore be desirable to provide a mechanism for more efficiently utilizing control blocks to minimize the memory needed to support a specified number of connections.

BRIEF SUMMARY OF THE INVENTION

A method and apparatus are disclosed which permit control blocks in a telecommunications device, such as a network switch, to be fully utilized so as to support at least two unidirectional connections and thereby avoid the allocation of memory to a control block which remains unused. By utilizing a single control block to support two unidirectional connections, the amount of memory needed to support a specified number of connections may be significantly reduced.

Requests for virtual connections are supported by storing connection information in the control block. Each control block contains at least a first portion for mapping traffic emanating from a source user node (leaf) and a second portion for mapping traffic received by that user node (root) from another source user node. In accordance with the present invention, both portions of the control block may contain valid connection mapping information at one time.

In one embodiment of the invention, each network switch at the edge of the network maintains lists which identify the control blocks that have been allocated by the respective switch. Additionally, the lists maintained at each switch identify whether the control blocks that have been allocated are fully utilized or whether the respective control blocks have the first or second control block portions available for use.

More specifically, information which defines the portions of the control blocks that have been assigned for connection mapping is stored within lists which are utilized when connections are added or deleted. The control block lists each contain identifications of control blocks. Three lists are employed in a preferred embodiment of the invention. A first list, herein referred to as the combined list, contains the identification of each control block for which both the first (leaf) and second (root) control block portions are utilized. A second list, herein referred to as the root list, contains the identification of each control block for which only the second portion of the control block (the root portion) has been utilized. A third list, herein referred to as a leaf list, contains the identification of each control block for which only the first portion (the leaf portion) of the control block has been utilized.

The lists are updated when connections are added or deleted. Each connection is associated with a user through a port which represents a physical interface to a user. When a connection needs to be added at a switch servicing a source user node (leaf) or a destination user node (root), the root list or leaf list at the respective switch is examined to determine whether a currently allocated control block, associated with the user port at that node, is identified in the respective list. The presence of the identification of the control block in the leaf list indicates that the leaf portion of the respective control block is utilized. The presence of the identification of the control block in the root list indicates that the root portion of the respective control block is utilized. Furthermore, the presence of the identification of a control block in a root list indicates that the first (leaf) portion of the respective block is unused and available for connection mapping and the presence of the identification of a control block in a leaf list indicates that the second (root) portion of the respective block is unused and available for connection mapping.

To establish a connection for traffic emanating from a source user node, the root list within the network switch coupled to that node is scanned to determine if an allocated control block exists associated with the respective user port which has the first (leaf) portion available for connection mapping. If such a control block is identified within the root list, the control block identification is deleted from the root list and added to the combined list. If such a control block is not found within the root list, a control block is allocated for the respective connection and the control block identification is added to the leaf list.

To establish a connection for traffic destined for a destination user node, the leaf list within the network switch coupled to that node is scanned to determine if an allocated control block exists associated with the respective user port which has the second (root) portion available for connection mapping. If such a control block is identified within the leaf list, the control block identification is deleted from the leaf list and added to the combined list. If such a control block is not found within the leaf list, a control block is allocated for the respective connection and the control block identification is added to the root list.

To delete a connection for traffic emanating from a source user node, the combined list within the network switch coupled to that node is scanned to determine if the allocated control block supporting that connection is using both portions for connection mapping. If such a control block is identified within the combined list, the control block identification is deleted from the combined list and added to the root list, thereby indicating the second (root) portion still in use. If such a control block is not found within the combined list, then this control block was only using the first (leaf) portion. The control block allocated for the respective connection is returned to a free memory pool and the control block identification is deleted from the leaf list.

To delete a connection for traffic destined to a destination user node, the combined list within the network switch coupled to that node is scanned to determine if the allocated control block supporting that connection is using both portions for connection mapping. If such a control block is identified within the combined list, the control block identification is deleted from the combined list and added to the leaf list, thereby indicating the leaf (leaf) portion still in use. If such a control block is not found within the combined list, then this control block was only using the second (root) portion. The control block allocated for the respective connection is returned to free memory pool and the control block identification is deleted from the root list.

In the foregoing manner control blocks more efficiently utilize available memory resources.

BRIEF DESCRIPTION OF THE SEVERAL VIEWS OF THE DRAWING

FIG. 10 shows the progression of exemplary connections in the illustrative example presented herein.

DETAILED DESCRIPTION OF THE INVENTION

In accordance with the present invention, a method and apparatus for allocating and deallocating connections to control blocks is disclosed which optimizes the memory utilization within a telecommunications device such as a network switch. More specifically, unused connection assignments in allocated control blocks are employed, were possible, rather than allocating a new control block and unnecessarily utilizing the additional memory resources associated with such an allocation.

The method and apparatus presently described employ a plurality of lists which maintain control block utilization information. From these lists, it may be determined whether a control block has been allocated for one connection but remains available for allocation of an additional connection.

Figure 1:
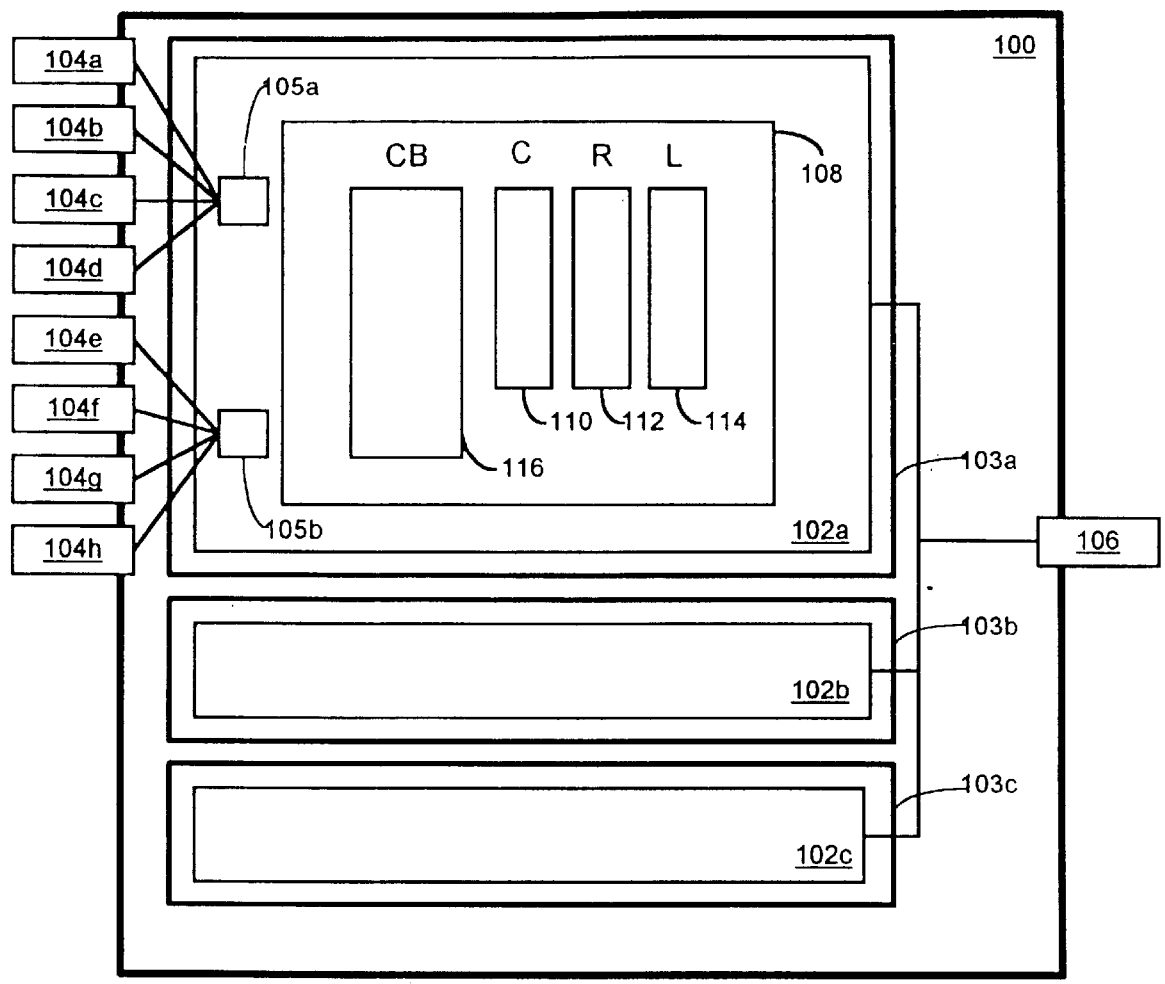
FIG. 1 illustrates a network switch incorporating a control block allocation mechanism in accordance with the present invention.

A telecommunications device illustrating the lists employed in accordance with the present invention is depicted in FIG. 1. Referring to FIG. 1, a telecommunications device 100 includes a plurality of input/output (I/O) modules such as I/O modules 102a, 102b and 102c, each residing in a respective slot 103a, 103b, and 103c. One or more I/O modules 102 each occupy one of the interconnected slots 103 within such a device, and can be configured for various functions, such as high-speed trunk line connections, user port routing, or packet translation between different formats, such as IP frames to ATM cells. Each I/O module includes one or more ports, such as ports 104a through 104h, for coupling the respective I/O module to user devices. Each I/O module includes at least one forwarding engine. Each forwarding engine services one or more ports 104 to which the forwarding engine 105 is coupled. In the illustrated embodiment, two forwarding engines 105a and 105b which service ports 104a–104d and 104e–104h respectively, are shown. The user device may comprise a computer workstation, a peripheral device, such as a printer, plotter, processor, or any other suitable computer apparatus which may be coupled to the network.

As discussed above, control blocks are employed to map a user to a virtual connection for either incoming or outgoing traffic at an I/O module. Control blocks are a data structure which historically has been employed to map either incoming or outgoing traffic to a user, but not both, notwithstanding the fact that the data structure for the control block was of sufficient size to accommodate allocations for both. In accordance with the presently disclosed method and apparatus, lists are maintain regarding the utilization of control blocks such that unused portions of allocated control blocks may also be utilized. In this manner, memory may be more efficiently used.

Figure 1A:
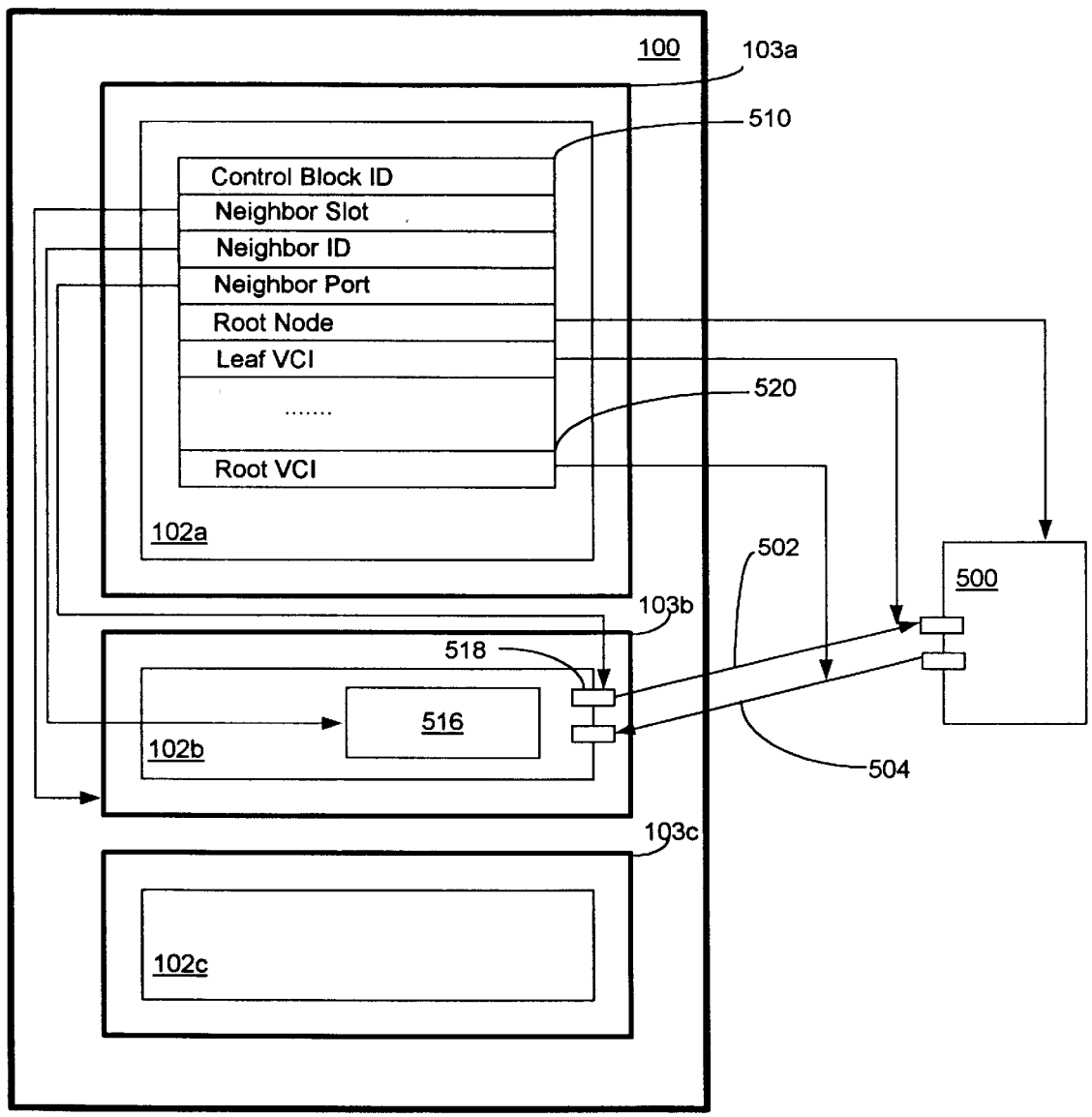
FIG. 1a shows the data structure for a control block such as depicted in FIG. 1.

A data structure for a control block is depicted in FIG. 1a. FIG. 1a illustrates two unidirectional connections between network switch nodes 100 and 500. User root and leaf information are managed by I/O module 102a, while a neighboring trunk line I/O module 102b in slot 103b manages the virtual connections 502 and 504 between the nodes 100 and 500. The relevant leaf fields 510 are shown in I/O module 102a in slot 103a. A Control Block ID field uniquely identifies the control block within the memory space of the I/O module. The Neighbor Slot field identifies the slot 103 containing the neighboring trunk line I/O module 102b. Neighbor ID is the index of a trunk management block 516 in memory 102b of the neighbor I/O module. The Neighbor Port field identifies the port 518 on the neighbor I/O module 102b handling the virtual connection 502 from the leaf node 100 to the root node 500. The Root Node Id field indicates the remote root node 500. Leaf VCI (virtual connection identifier) indicates the virtual connection 502 to be used for traffic emanating from node 100 destined for node 500. The field concerned with the root is Root VCI, and identifies the virtual connection 504 over which data will be received from the leaf node 500 by root node 100.

Referring again to FIG. 1, memory 108 associated with each I/O module maintains several lists which are used to track the allocation and utilization of the control blocks 116 within the respective I/O modules. In particular, in the present embodiment, a combined list (C) 110, a root list (R) 112 and a leaf list (L) 114 are employed to keep track of the allocation and utilization of the respective control blocks.

The combined list 110 contains the identification of each control block for which the first and second control block portions are utilized. Thus, the combined list identifies those control blocks which have been allocated and fully utilized for mapping one incoming connection and one outgoing connection to a user.

The root list 112 contains the identification of each control block for which only the second portion of the control block (the root portion) has been utilized. Accordingly, the control blocks identified within the root list have not utilized the first portion of the control block (the leaf portion) and such portion remains available for assignment.

The leaf list 114 contains the identification of each control block for which only the first portion (the leaf portion) of the control block has been utilized. Accordingly, the control blocks identified within the leaf list have not utilized the second portion of the control block (the root portion) and such portion of the identified control blocks remains available for assignment.

The above described lists are used cooperatively when setting up and tearing down connection assignments so as to fully utilize a control block, if possible, for mapping an incoming connection to a user and an outgoing connection from a user via a single control block. The use of the combined list, the leaf list, and the root list is explained in greater detail below.

Figure 2:
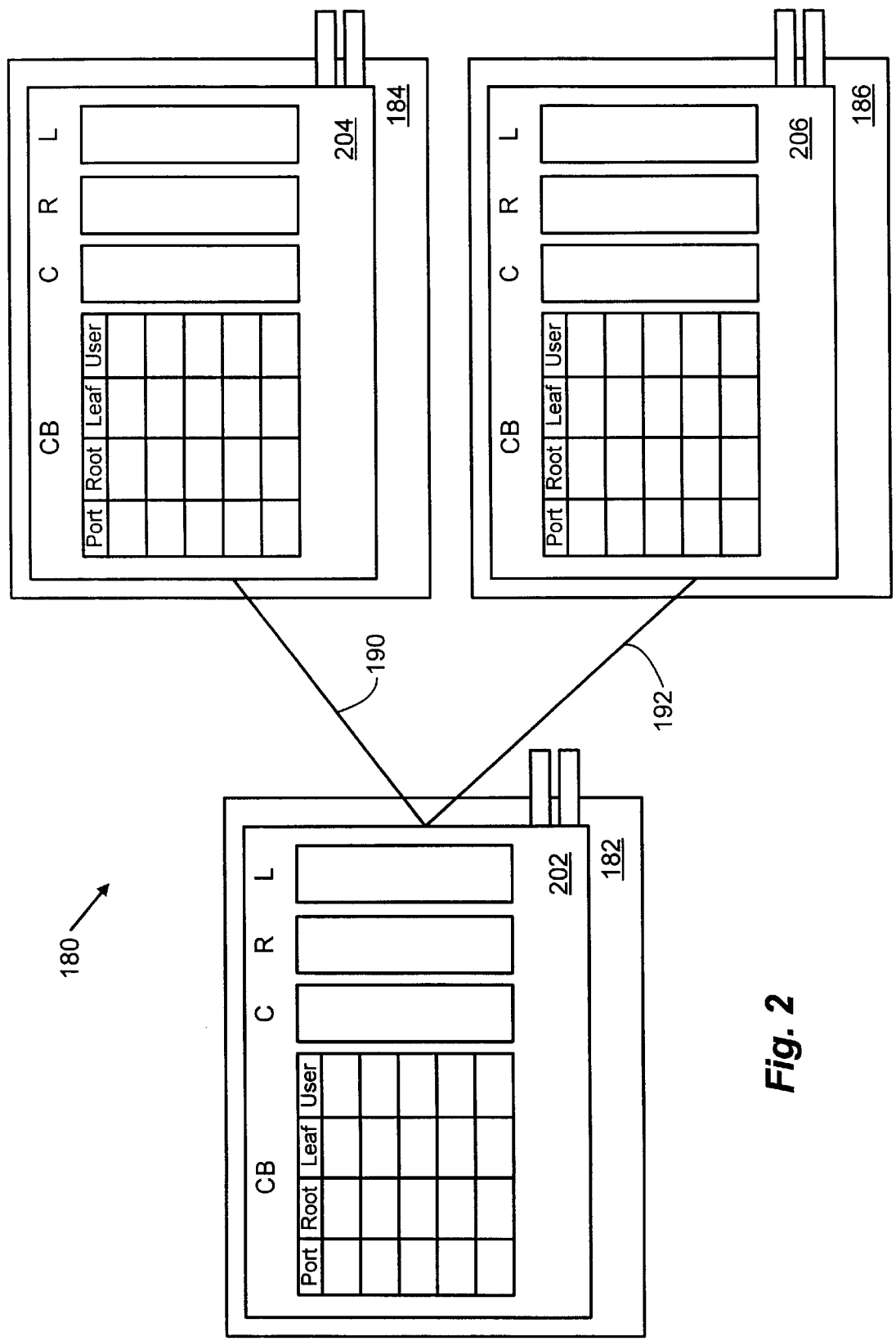
FIG. 2 is a block diagram illustrating three network switch nodes with control block allocation lists in accordance with the present invention.

FIGS. 1 and 2 illustrate a three node network 180 which comprises nodes 182, 184 and 186. Each node contains one or more I/O modules, such as I/O modules 202, 204 and 206. Node 182 is coupled to nodes 184 and 186 by communication links 190 and 192 respectively. A memory 108 is provided which, among other possible uses, is employed to store control blocks (CB) 116, the combined list (C) 110, the root list (R) 112 and the leaf list (L) 114. While the respective lists are illustrated as being of short finite length for purposes of explanation, the actual size of the lists will vary based upon the number of control blocks employed and the utilization of those control blocks and will vary over time as connections are added and deleted. FIG. 2 illustrates the status of the respective lists prior to the allocation of any control blocks. Accordingly, the combined lists, the root lists and the leaf lists include no control block identifications within any of respective I/O modules of the respective nodes.

Figure 3:
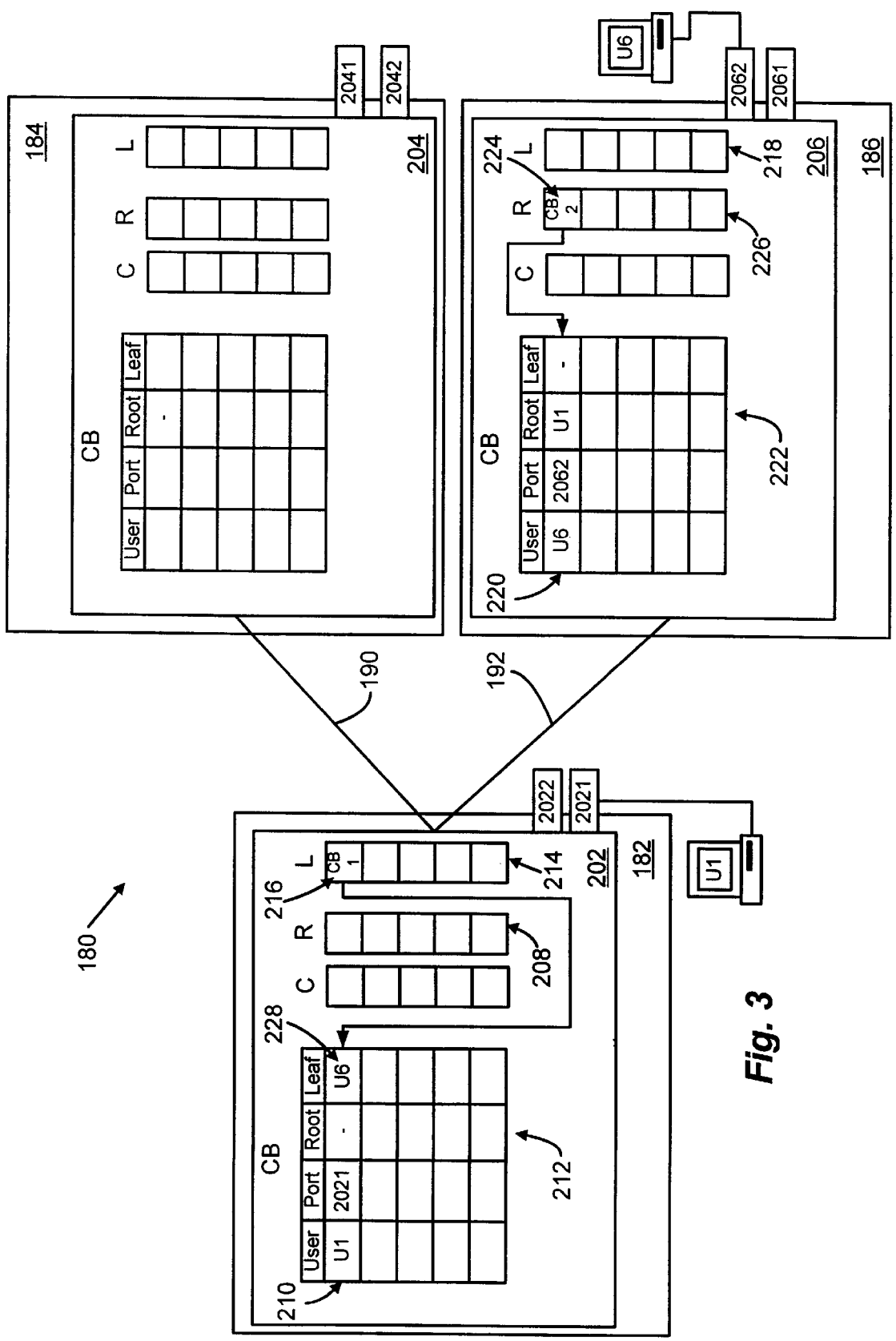
FIG. 3 is a block diagram illustrating the status of control block allocation lists after a first connection request is serviced.

FIG. 3 depicts the lists within the respective nodes following the allocations of control blocks as hereinafter discussed. More specifically, referring to FIG. 3, user U6 issues a connection request to node 182 requesting that user 1 (U1) be established as a leaf of user 6 (U6) so as to support unidirectional communication from user 1 (U1) to user 6 (U6). In response to the request, the root list 208 within node 182 is searched to determine if there is an allocated control block serving as a root for user 1 (U1) which could support a leaf connection. More specifically, the root list is searched to determine if there is an allocated control block serving a port compatible with user 1 (U1) in which the leaf portion of the control block remains unused. A port is compatible to support an additional connection if it serves the same user or another user coupled to the same forwarding engine. Since in its illustrated state, the root list 208 is empty, no match is found. A control block 210 is then allocated from a control block memory pool 212 to associate user 1 (U1) with port 202I. Additionally, the leaf list 214 is updated with an entry CB1 216 which points to the control block 210. The control block 210 is employed to establish a connection in which U1 acts as a leaf of U6 and can thus communicate message information from user 1 (U1) to user 6 (U6) over the respective connection.

After user 1 (U1) is established as a leaf of user 6 (U6) at node 182, user 6 (U6) is established as a root for user 1 (U1) at node 186. More specifically, the leaf list 218 at node 186 is searched to determine if user 6 (U6) is associated with any control blocks in which the leaf portion is used and the root portion is unused. As no such control blocks are to be found in the present example, a control block 220 is allocated from the control block memory pool 222. An entry CB2 224 is then made in the root list 226 which points to control block 220. The entry CB2 224 in the root list 226 identifies the respective control block as a control block having the root portion allocated and the leaf portion unallocated. User 6 (U6) is thereby established as a root for user 1 (U1).

Figure 4:
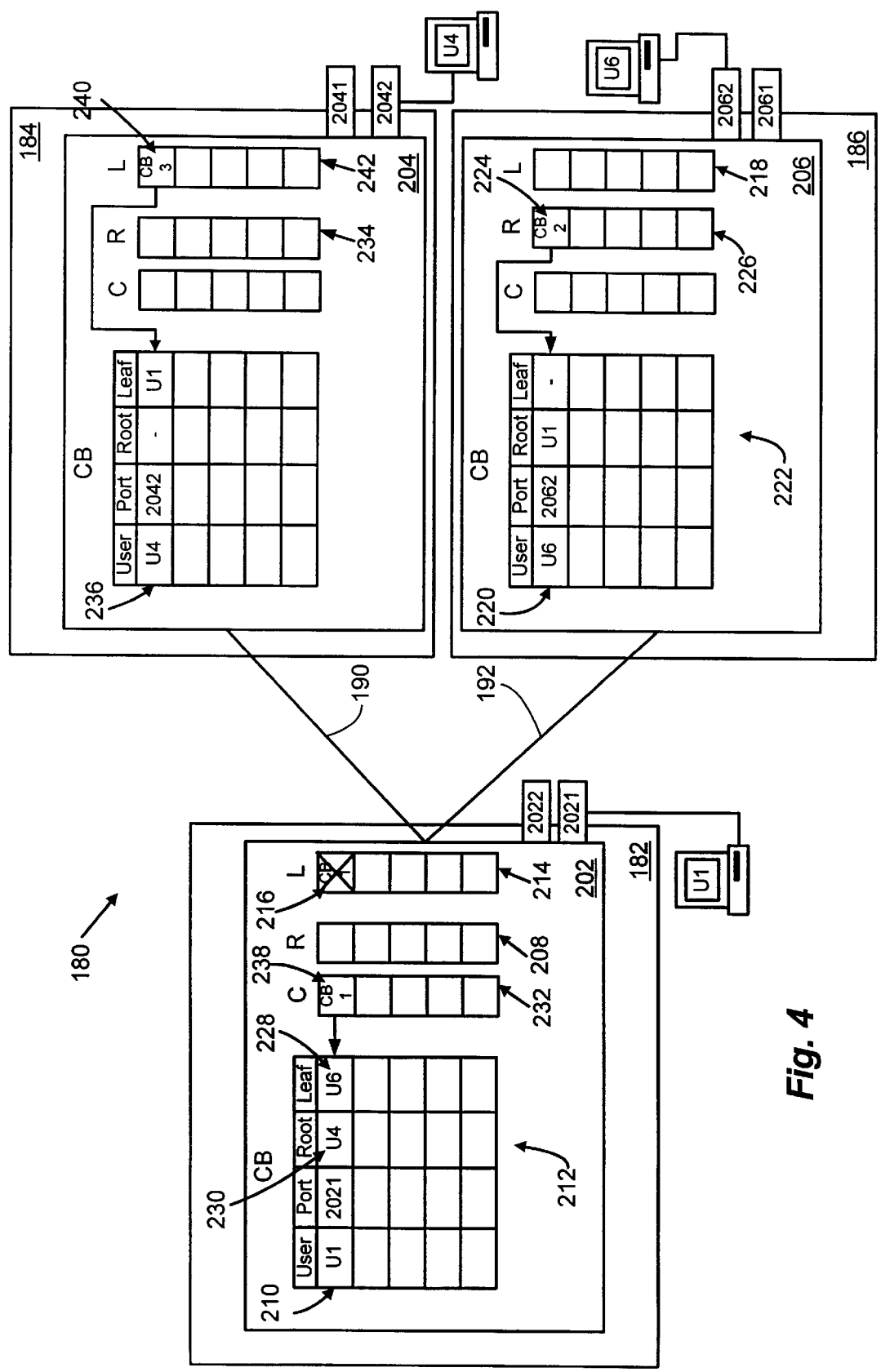
FIG. 4 is a block diagram illustrating the status of control block allocation lists after a second connection request is serviced.

In the illustrated example, referring to FIGS. 3 and 4, user 1 (U1) next establishes a connection from user 4 (U4) (a leaf) to user 1 (U1) (the root). This connection permits the transmission of messages from the source node U4 to the destination node U1. The leaf list 214 at node 182 is searched to determine if an allocated control block supporting a port compatible with user 1 (U1) exists which has the leaf portion used and the root portion unused. The leaf list entry CB1 216 points to allocated control block 210. Referring to FIG. 3, control block 210 has the root portion unused. As depicted in FIG. 4, U4 is then entered in the root portion 230 of the control block 210, the CB1 entry 216 is deleted from the leaf list 214 and a CB1 entry is made within the combined list 232 as new entry 238. The entry CB1 within the combined list 232 indicates that the respective control block 210 is fully utilized with both root and leaf portions of the control block allocated for incoming and outgoing connection traffic respectively.

At node 184, the root list 234 is searched to determine if a control block has been allocated supporting a port compatible with user 4 (U4) in which the root portion of the control block is used and the leaf portion of the control block is unused. As indicated in FIG. 4, no matching entries are found. Accordingly, a control block 236 is allocated for user 4 (U4) and the leaf portion of the control block 236 is employed to establish the connection to user 1. As illustrated in FIG. 4, user 4 (U4) is coupled to the I/O module 204 via port 204₂. An entry 240 is made in the leaf list 242 within the node 184 which points to the respective control block 236. The connections which have been established as of the present stage in this example include U1 as a leaf to U6 and U4 as a leaf to U1. Such connections are depicted in FIG. 10b.

Figure 5:
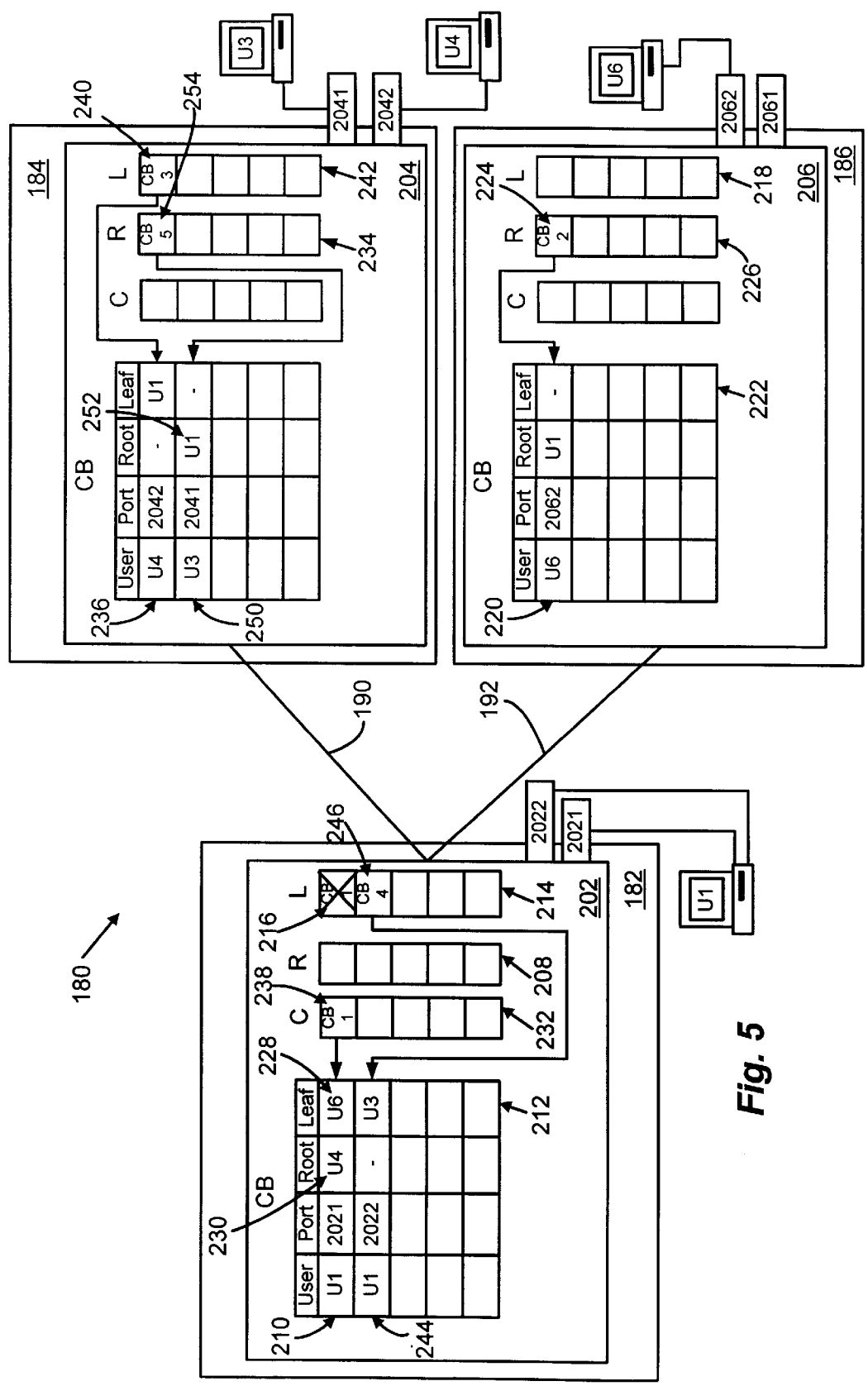
FIG. 5 is a block diagram illustrating the status of control block allocation lists after a third connection request is serviced.

FIG. 5 illustrates the use of the various lists in the allocation of control blocks to establish user 1 (U1) as a leaf node of user 3 (U3). Such a connection permits the transmission of messages from user 1 (U1) to user 3 (U3). The connection is initiated when user 3 (U3) forwards a request to user 1 (U1) to initiate the process whereby U1 is established as a leaf of U3. At node 182, the root list 208 is searched to identify a control block which has the root portion allocated for a port compatible with user 1 but has the leaf portion of the respective control block unallocated. In the present instance, no such entries are found. A control block 244 is therefore allocated at node 182. An entry CB4 246 is made in the leaf list 214 at node 182. The entry CB4 246 within the leaf list 214 points to the control block 244 within the control block memory.

Figure 6:
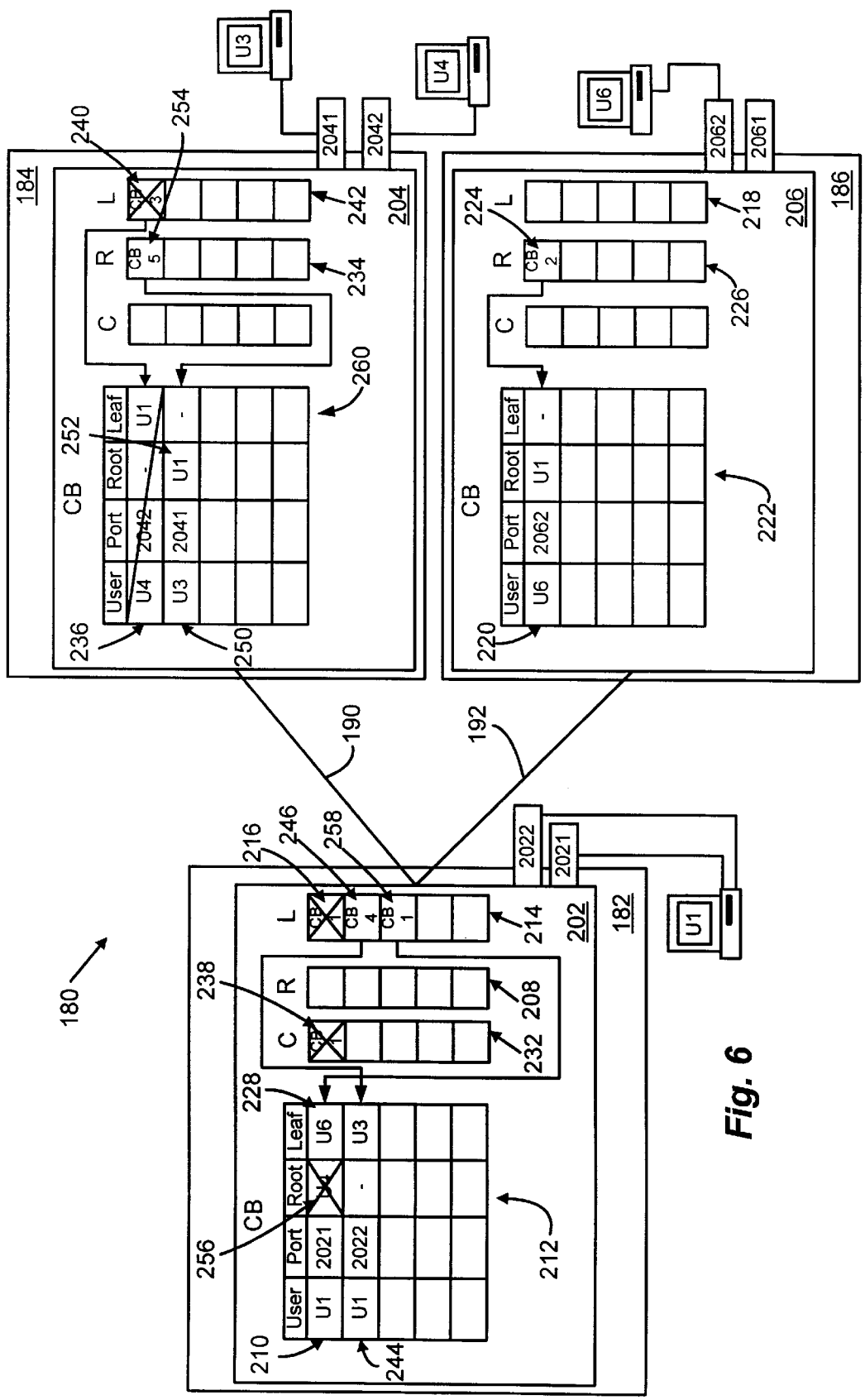
FIG. 6 is a block diagram illustrating the status of control block allocation lists after a disconnection request is serviced.

At node 184, the leaf list 242 is searched to determine if any control blocks have been allocated for a port compatible with user 3 (U3) which have a leaf portion of the respective control block used and the root portion of the control block unused. No entry is found within the leaf list 242 which satisfy the above specified criteria. Accordingly, as depicted in FIG. 6, the control block 250 is allocated to establish user 3 (U3) as a root for user 1 (U1) and an entry U1 is made within the root portion 252 of the allocated control block 250. Additionally, an entry CB5 254 is made within the root list 234 which points to control block 250. After establishing U1 as a leaf of U3, the connections are as indicated in FIG. 10c.

The disconnection of user U4 as a leaf with respect to user U1 is illustrated by reference to FIGS. 6 and 7. When tearing down U4 as a leaf of U1, the control block 210 is modified to eliminate U4 256 within the root portion of the respective control block as depicted in FIG. 6. Additionally, since both portions of the control block are no longer occupied within control block 210, the pointer CB1 is deleted from the combined list 232 within the node 182 and a new entry 258 is made within the leaf list. The entry within the leaf list indicates that the root portion for the respective control block entry is available. Thus control block 210 is now capable of supporting an additional root connection on a port compatible with user 1 (U1). At node 184, the control block 236 servicing user 4 (U4) was only utilizing the leaf portion of the control block. Thus the elimination of U4 as a leaf of U1 allows the control block 236 to be returned to the free control block memory pool for reassignment. The entry CB3 240 within the leaf list 242 which points to the control block 236 is removed from that list since the control block 236 no longer exists and the entire control block is available for reallocation. FIG. 10d illustrates the state of the connections following the disconnection of user 4 (U4) as a leaf of user 1 (U1).

Figure 7:
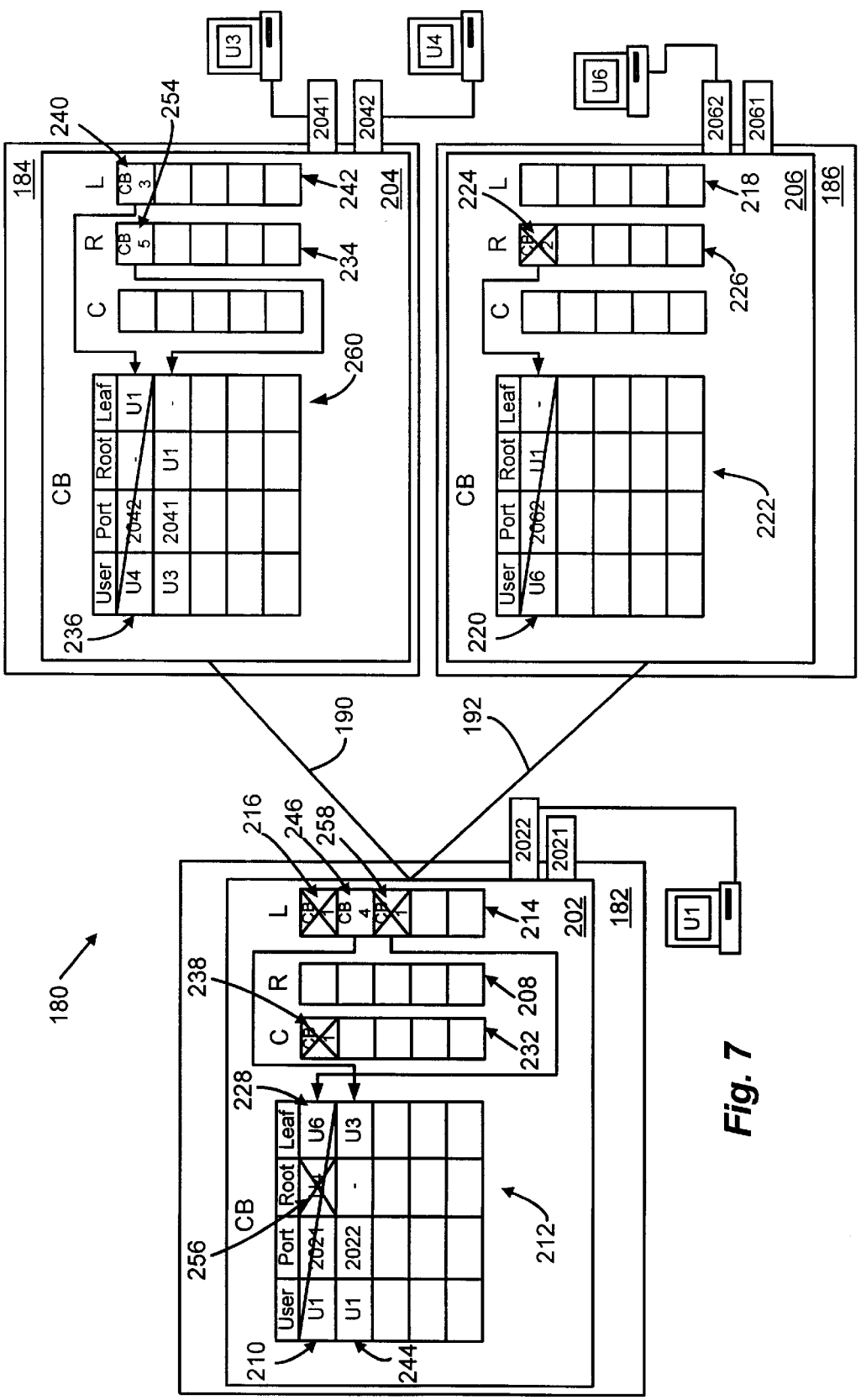
FIG. 7 is a block diagram illustrating the status of control block allocation lists after a second disconnection request is serviced.

FIG. 7 further illustrates the disconnection of user 1 (U1) as a leaf of user 6 (U6). As depicted, at node 182, control block 210 supports the connection of user 1 (U1) as a leaf of user 6 (U6). As only the leaf portion of the control block 210 is used following the disconnection of user 4 (U4) as a leaf of user 1 (U1), following the disconnection of user 1 (U1) as a leaf of user 6 (U6), control block 210 is returned to the free pool 212 of control blocks. Additionally, the entry CB1 258 within the leaf list 214 is deleted. At node 186, upon disconnection of user 6 (U6) as a root for user 1 (U1), the control block 220 is returned to the free pool 222, since the respective control block leaf portion was not utilized. Finally, the entry CB2 224 within the root list 226 is deleted. The status of connections following disconnection of U1 as a leaf of U6 is illustrated in FIG. 10e.

In the foregoing manner, control blocks are fully utilized when such is possible. The present invention thereby avoids the undesirable allocation of memory which remains unused as has historically occurred.

Figure 8:
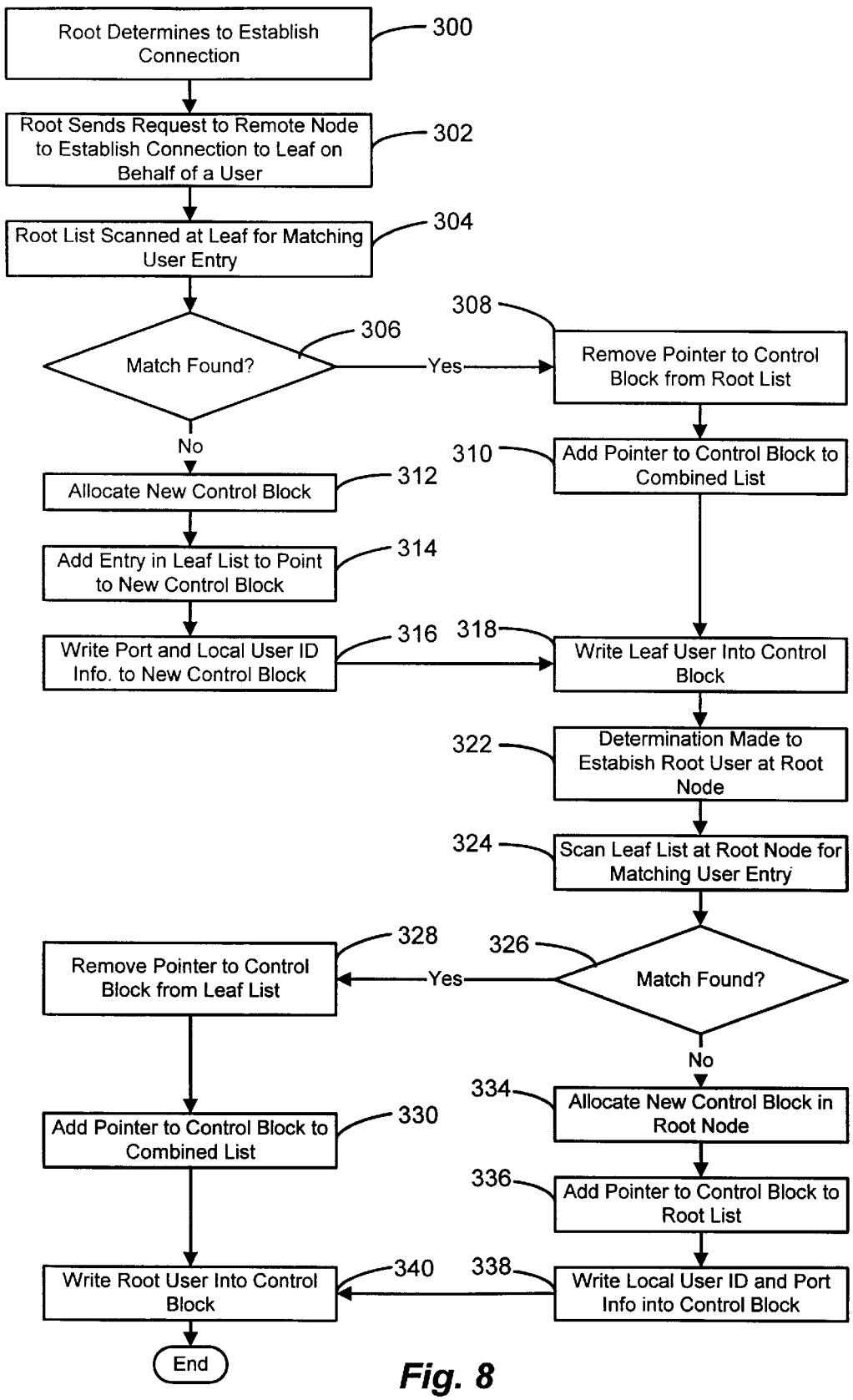
FIG. 8 is a flowchart illustrating the method for maintaining the control block allocation lists when establishing a connection.

The method of using the presently disclosed lists to establish connections and allocate control blocks is depicted in the flow chart of FIG. 8. A root node determines that a connection needs to be established to a remote node as depicted in step 300. The root node sends a request to the remote node to establish it as a leaf as illustrated in step 302. As depicted in step 304, the root list in then scanned at the remote node to determine if there is an allocated control block serving a compatible port for the local user which has the root portion of the control block utilized and the leaf portion of the control block unused. If there is such an allocated control block, as determined in inquiry step 306, that control block will be used to support the connection of the local user as a leaf. Assuming that such a control block exists, the pointer to the control block is removed from the root list in the remote node, as shown in step 308, and a pointer to the control block is added to the combined list within the remote node as depicted in step 310. The identification of the leaf user is written into the control block as depicted in step 318. A determination is also made to establish a user at a root at the root node as illustrated in step 322. The leaf list is scanned at the root node to determine if any control blocks have been allocated for a port compatible with the respective local user which have the leaf portion of the control block allocated and the root portion available for assignment as depicted in step 324. If a control block is located compatible with the local user which has the leaf portion of the control block allocated and the root portion of the control block available for assignment, as depicted in decision step 326, the pointer to the respective control block is removed from the leaf list as illustrated in step 328 and a pointer to the control block is added to the combined list at the root node as shown in step 330. The local user identification information is written to the control block as illustrated and step 340. If, as a result of inquiry step 326, it is determined that no control blocks exist compatible with the respective user which have the leaf portion assigned and the root portion available for assignment, control passes to step 334. A new control block is allocated, as depicted in step 334 and a pointer to the control block is added to the root list as illustrated in step 336. As illustrated in step 338, the local user identifier and port identifier are written to the control block. As depicted in step 340, the remote user identifier is then written to the root portion of the control block to identify the local user as a root for the remote user.

If, as a result of inquiry step 306, it is determined that no control blocks exist for the respective user which have the root portion assigned and the leaf portion available for assignment, a new control block is allocated as illustrated in step 312. Additionally, an entry is added to the leaf list to point to the new control block as shown is step 314. As depicted in step 316, the port and local user information necessary to support the connection is written to the control block. Additionally, as illustrated in step 318, the leaf user identification is written to the leaf portion of the control block. Processing then continues at step 322.

Figure 9:
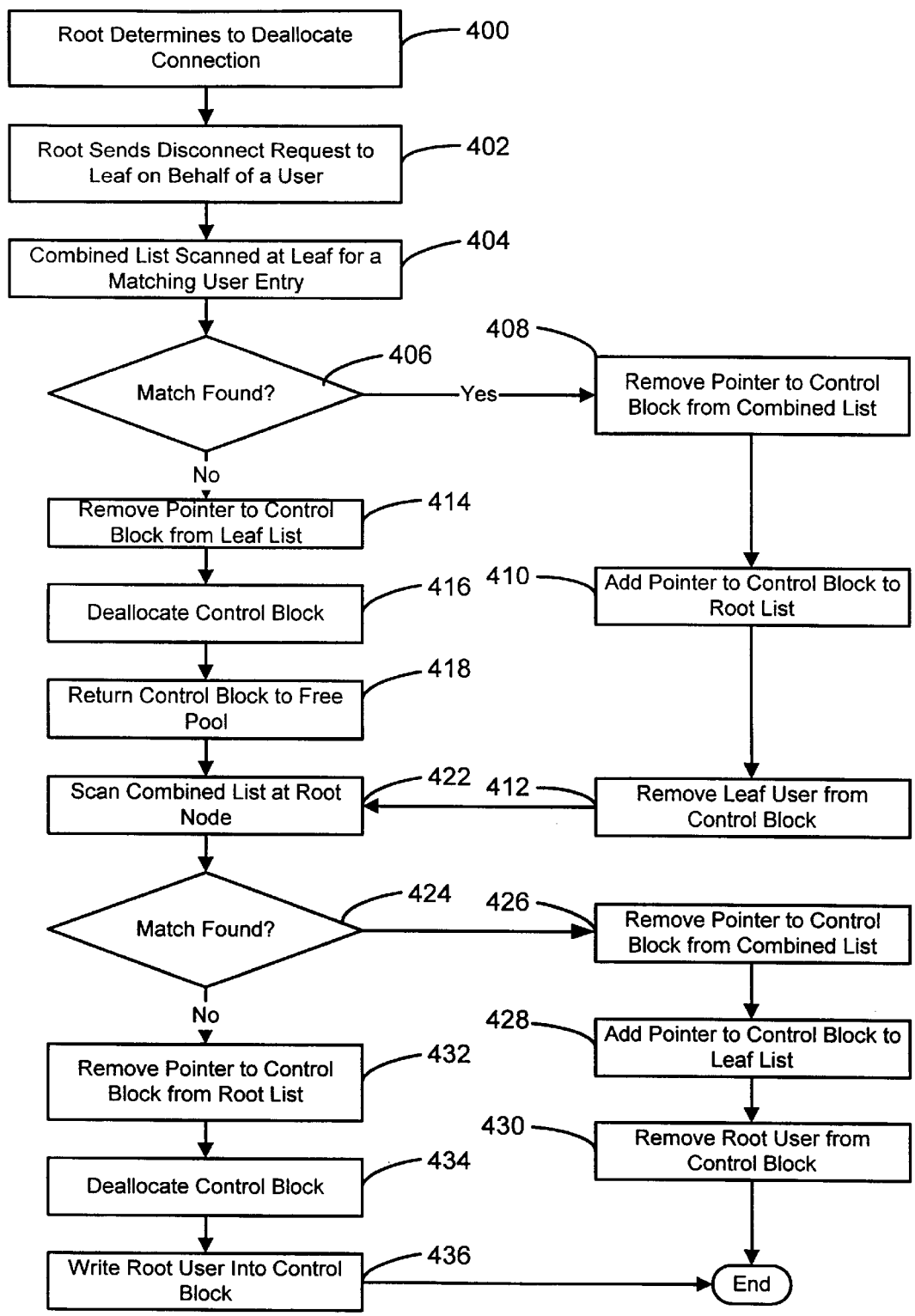
FIG. 9 is a flowchart illustrating the method for maintaining the control block allocation lists when relinquishing a connection.

The method associated with the deallocation of a connection is illustrated in FIG. 9. First, a root user determines to deallocate a connection as depicted in step 400. Subsequent to this determination, the root node sends a disconnect request to the associated leaf on behalf of the root user as illustrated in step 402. The combined list is scanned at the leaf node to determine if there is a matching entry to a control block for the respective leaf user within the combined list. If a match is found within the combined list as indicated by an affirmative response to the inquiry illustrated in step 406, the pointer to the respective control block is removed from the combined list, as depicted in step 408, and a pointer to the respective control block is added to the root list within the leaf node, as depicted in step 410. The leaf user information is removed from the leaf portion of the control block within the leaf node, as illustrated in step 412, and control is passed to step 422.

As depicted in step 422, the combined list at the root node is scanned to determine if any control blocks compatible with the respective user exist which have both the root portion and the leaf portion for the control block assigned. If, as a result of inquiry step 424, it is determined that a fully allocated control block exists for the respective connection as reflected by an affirmative response to inquiry step 424, the pointer to the respective control block is removed from the combined list within the root node, as illustrated in step 426. A pointer to the control block is added to the leaf list, as depicted in step 428, and the root portion of the respective control block is deleted.

If, as a result of inquiry step 424, it is determined that no control blocks within the combined list match the specified criteria for the respective connection, the pointer to the control block is removed from the root list within the root node as depicted in step 432, the control block is deallocated as depicted in step 434 and the control block is returned to the free control block pool, as illustrated in step 436.

If, as a result of inquiry step 406, it is determined that no control blocks for the respective user are identified within the combined list of the leaf node, the pointer to the control block is removed from the leaf list within the leaf node, as depicted in step 414. The control block is deallocated, as illustrated in step 416, and the control block is returned to the free control block pool as illustrated in step 418. Processing continues at step 422 as previously discussed.

In accordance with the above described method, root and leaf portions of control blocks are deallocated while keeping track of those control blocks which have leaf and root portions available for assignment. In the foregoing manner the utilization of memory associated with control block allocations is minimized.

It will be apparent to those of ordinary skill in the art that variations of and modifications to the above described method and apparatus for allocating control blocks in a telecommunications device are possible without departing from the inventive concepts herein described. Accordingly, the present invention is not to be viewed as limited except as by the scope and spirit of the appended claims.

What is claimed is:

1. A method for storing connection information in a control block for a user within a telecommunications device to map said user to a connection in a computer network, wherein the control block has separately assignable first and second portions for storing information mapping a connection to or from the user respectively, and wherein a record comprised of a plurality of lists identifies utilization of said control block portions, said method comprising the steps of:

examining said record and obtaining the identification of control blocks in which one of said portions is unutilized;

determining if a control block for said user has been allocated in which only one of the first and second portions has been utilized;

in the event it is determined as a result of said determining step that no control block for said user has been allocated, adding the identification of a new control block to the record noting said new control block contains said mapping information in one of said portions and noting which one of the first and second portions has been utilized by placing the identification on the respective list of the plurality of lists;

in the event it is determined as a result of said determining step that only one of said first and second portions has been utilized, storing control block information in the other one of said portions of said control block upon receipt of a request to map corresponding connection information for said user; and adding to the identification of the control block in said record noting said control block contains valid mapping information in both the first and second portions upon storage of valid control information in both the first and second portions.

2. The method of claim 1 further comprising the step of moving said identification of said control block from one of said lists to another one of said lists depending on which of said portions is unutilized.

3. The method of claim 1 further comprising the step of removing the identification of said control block from one of said lists depending on which of said connections is being deleted.

4. A telecommunications switch for transmitting and receiving data associated with users comprising:

a plurality of user ports;

at least one control block, each control block comprising:
a field for identifying a user;
a field for identifying a port associated with the user specified within said user identifying field;
a field for identifying an input connection comprising an identification of a first unidirectional channel from a first remote user to the user identified within said user identifying field; and
a field for identifying an output connection comprising an identification of a second unidirectional channel from the user identified within said user identifying field to a second remote user;

each input connection field having one of an active state in which said input connection field contains a valid identification of said first unidirectional channel and an inactive state in which said input connection field is available for assignment of a valid first unidirectional channel identifier;

each output connection field having one of an active state in which said output connection field contains a valid identification of said second unidirectional channel and an inactive state in which said output connection field is available for assignment of a valid second unidirectional channel identifier;

an input list comprising at least one input list entry, wherein each of said at least one entry is associated with one of said at least one control block and wherein the input connection identifier field and the output connection identifier field for the respective control block are active and inactive respectively;

an output list comprising at least one entry, wherein each of said at least one output list entry is associated with one of said at least one control block and wherein the input connection identifier field and the output connection identifier field for the respective control block are in active and active respectively;

a combined list comprising at least one entry, wherein each of said at least one combined list entry is associated with one of said at least one control block and wherein the input connection identifier field and the output connection identifier field for the respective control block are both active.

5. The computer system as in claim 4 wherein said at least one control blocks further comprises a list of indexed elements.

6. The computer system as in claim 4 wherein said input list, said output list, and said combined list further comprise linked elements.

* * * * *